United States Patent [19]

Takeumra

[11] 3,882,535

[45] May 6, 1975

[54] COLOR TELEVISION IMAGE PICKUP APPARATUS PROVIDING FREQUENCY INTERLEAVED COLOR CARRIERS AND SIDEBANDS

[75] Inventor: Yasuo Takeumra, Kawasaki, Japan

[73] Assignee: Tokyo Shibaura Electric Co., Ltd., Kawasaki-shi, Japan

[22] Filed: Aug. 31, 1970

[21] Appl. No.: 68,459

[30] Foreign Application Priority Data

| | | |
|---|---|---|
| Aug. 30, 1969 | Japan | 44-68385 |
| Aug. 30, 1969 | Japan | 44-68386 |
| Aug. 30, 1969 | Japan | 44-68387 |
| Aug. 30, 1969 | Japan | 44-68388 |

[52] U.S. Cl. .......... 358/44

[51] Int. Cl. .......... H04n 9/06

[58] Field of Search .......... 178/5.4 ST; 350/162 SF; 358/41, 43, 44, 47

[56] References Cited

UNITED STATES PATENTS

| | | | |
|---|---|---|---|
| 2,907,817 | 10/1959 | Teer | 178/5.4 ST |
| 3,300,580 | 1/1967 | Takagi et al. | 178/5.4 ST |
| 3,419,672 | 12/1968 | Malouski | 178/514 ST |
| 3,470,310 | 9/1969 | Shashoua | 350/162 SF |
| 3,531,584 | 9/1970 | Bell | 178/5.4 ST |
| 3,647,943 | 3/1972 | Marshall | 178/5.4 |
| 3,647,948 | 3/1972 | Eto et al. | 178/5.4 ST |

*Primary Examiner*—Howard W. Britton
*Assistant Examiner*—George G. Stellar
*Attorney, Agent, or Firm*—Flynn & Frishauf

[57] ABSTRACT

Light transmitted through a color striped filter comprising alternately arranged first and second color filter elements each formed in a striped fashion is entered into an image pickup tube being tilted by a predetermined angle from the scanning direction so that each horizontal scanning by an electron beam may be commenced from the first and second filter elements alternately. Thus, signal components generated from the image pickup tube corresponding to the color light component transmitted through the colored filter elements have a phase difference of 180° at every horizontal scanning line and the frequency of the color signal components is interleaved intermediate the frequency of the horizontal scanning television signal.

5 Claims, 22 Drawing Figures

COLOR TELEVISION IMAGE PICKUP APPARATUS PROVIDING FREQUENCY INTERLEAVED COLOR CARRIERS AND SIDEBANDS

This invention relates to a color television image pickup apparatus, and more particularly to a color television image pickup apparatus which separates color signals by employing color filters.

Generally, when a television signal including a plurality of color components is to be imaged, two color striped filters of different pitch are located in an optical path between an object and the image pickup tube and a carrier signal taken out of the portion corresponding to the pitch of the color striped filter arrangement is amplitude-modulated to produce the television signal including said plurality of color components. Therefore, the color striped filter arrangement comprises a first color striped filter including alternate arrangement of layers which block a particular color light component and layers which transmit all color lights and arranged in perpendicular with the scanning line, and a second color striped filter including alternate arrangement of layers which block a particular color light other than said particular color light and layers which transmit all color lights and arranged perpendicularly to the scanning line. The striped image transmitted through the color striped filter arrangement is focussed onto a photoelectric plane of the image pickup tube and the focussed image is scanned by an electron beam of the image pickup tube to produce a plurality of carriers having appropriate side band and unmodulated components. Those frequency components obtained from the image pickup tube are then separated by a color signal separation circuit to generate a plurality of color signals.

In the system using such prior art color striped filter arrangement, however, when color light comprising a plurality of color components is precisely focussed on the photoelectric plane of the image pickup tube, the frequency component (unmodulated component) due to the color light transmitted through all of the filter layers of the first and second color striped filters interfere with the frequency component (modulated component) due to the color light blocked by the first and second color striped filters and hence the separation of the color components is decreased and Moire phenomena may occur. Thus it has been proposed to lower the optical response and to narrow the band of the picture image for improving the color separation. This approach, however, results in considerably more complex apparatus and also deteriorates resolution power. Another proposed approach is to use a higher carrier frequency to make the separation easier. But since there exists a limitation in the frequency response of the image pickup tube this approach brings about poorer SN ratio and poorer sharpness of the picture image. Thus, the prior art apparatus has various disadvantages and no reliable one has yet been provided.

It is, therefore, an object of this invention to provide a color television image pickup apparatus capable of effectively separating color components and generating high resolution color signals.

In accordance with the present invention, the above object may be accomplished by an optical system comprising a color filter arrangement in which light transmitting portions and light blocking portions for at least one color light component are alternately arranged in parallel with and perpendicularly to the horizontal scanning line, and means for forming color television signals in accordance with the light transmitted through said optical system, whereby the color signal can be obtained in an interleaved relation.

This invention can be more fully understood from the following detailed description when taken in connection with the appended drawings, in which.

Figure 7:
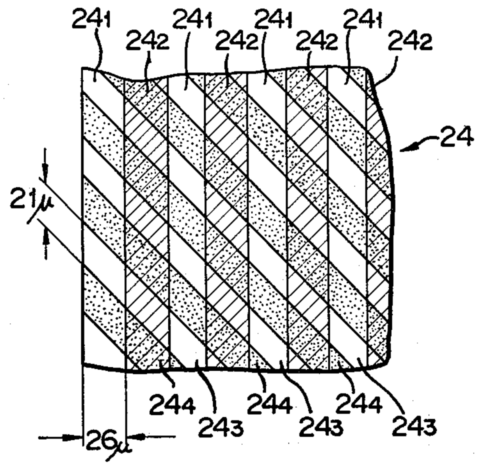
FIg. 7 illustrates another embodiment of a color striped filter adapted to be used for the optical system.
Figure 8A:
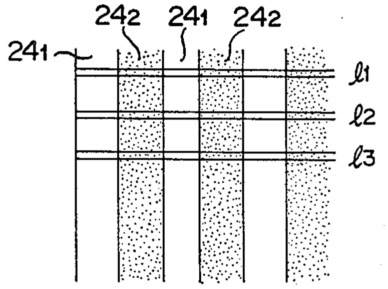
Figure 8B:
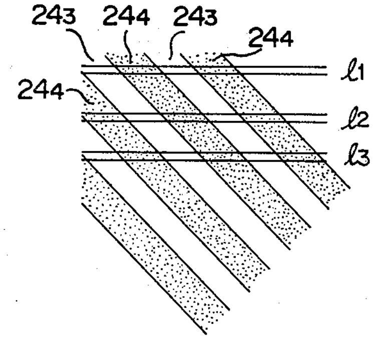
Figure 8C:
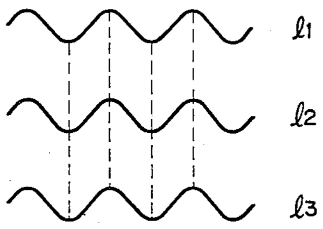
Figure 8D:
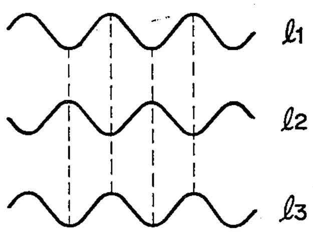
Figure 9:
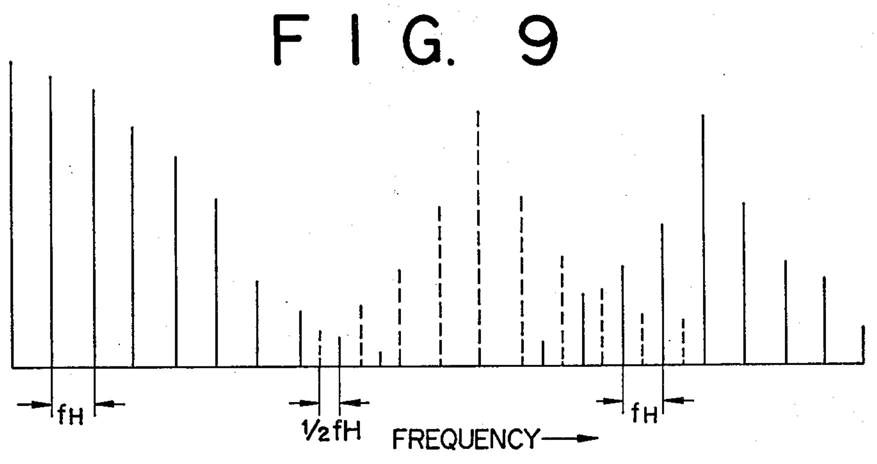
Figure 10:
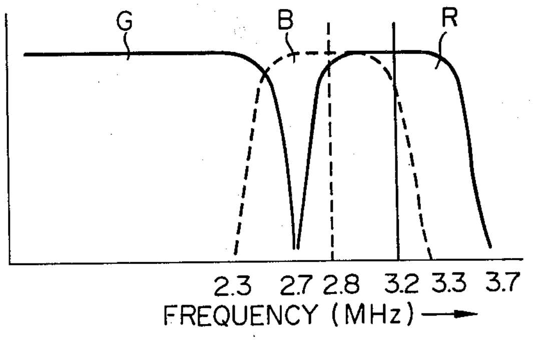
Figure 11:
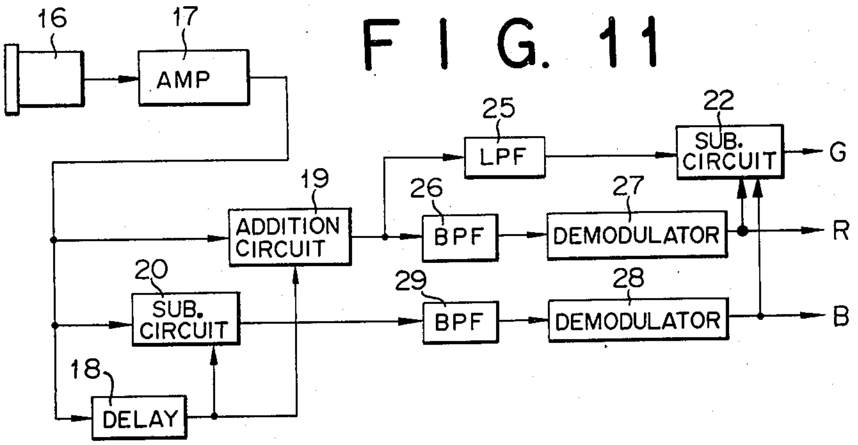
Figure 12:
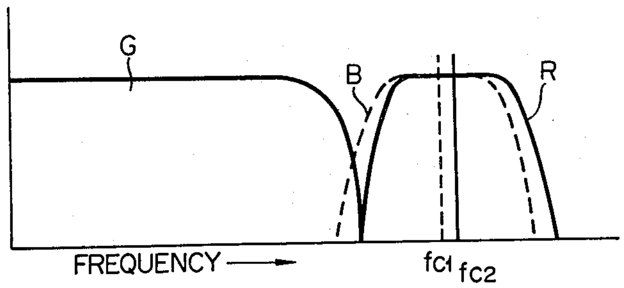
Figure 13:
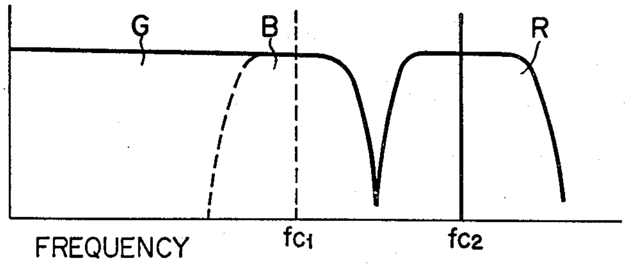
Figure 14:
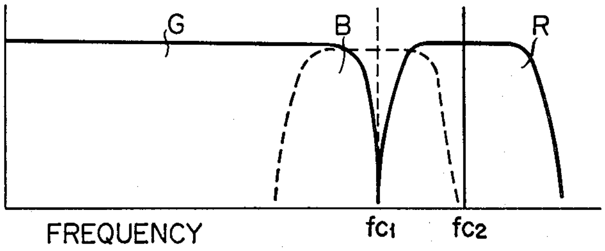
Figure 15:
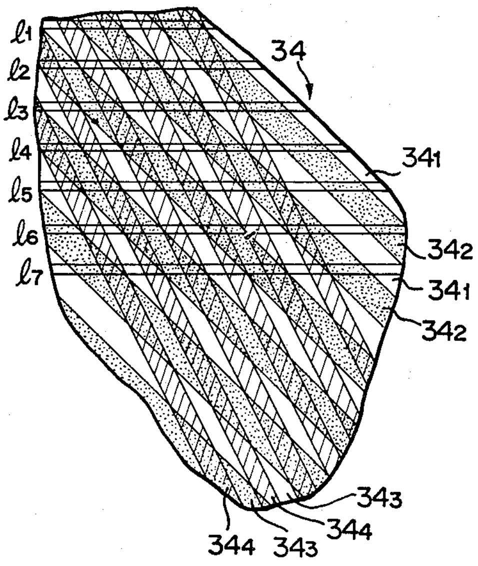
Figure 16:
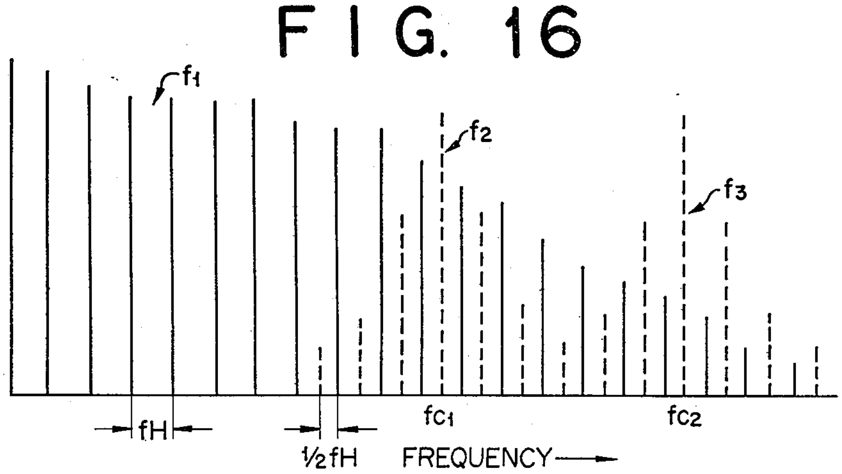
Figure 17:
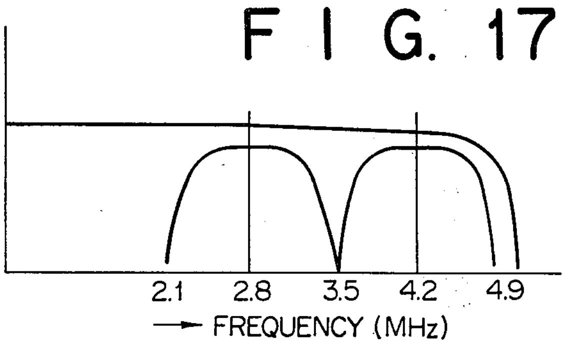
Figure 18:
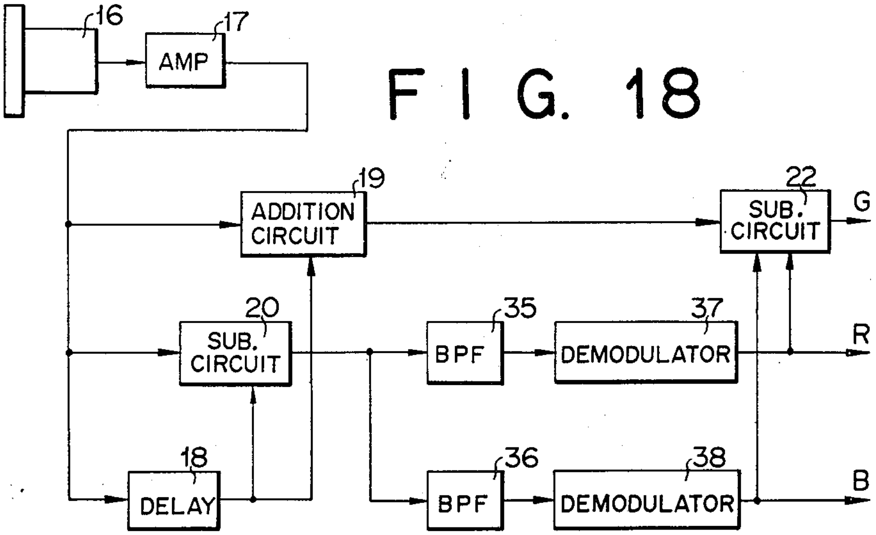

FIGS. 8A and 8B equivalently illustrate the color striped filter of FIG. 7;

FIGS. 8C and 8D respectively show waveforms of electrical signals derived from the color striped filters shown in FIGS. 8A and 8B;

FIG. 9 is a frequency spectrum chart of television signal derived from the color striped filter of FIG. 7;

FIG. 10 shows frequency characteristics of the signal derived through the striped filter of FIG. 7;

FIG. 11 shows another embodiment of the color signal separation circuit;

FIGS. 12, 13 and 14 show frequency characteristics wherein blue signal B and the unmodulated and modulated components interfere with each other;

FIG. 15 is an illustration of a still further embodiment of a color striped filter of the present invention;

FIG. 16 is a frequency spectrum chart of television signal derived from the filter shown in FIG. 15;

FIG. 17 shows a frequency characteristics of the signal obtained by the embodiment of FIG. 15; and FIG. 18 illustrates a further embodiment of a color signal operation circuit in accordance with the present invention.

One preferred embodiment of the present invention is explained with reference to FIGS. 1 to 6. In order to focus the optical color light of the object 11 including a plurality of color components onto the image pickup tube as described below, the optical color light is first collected to a field lens 13 through a picture lens 12. A color striped filter arrangement 14 including layers which block only the optical color light of particular color component and filter layers which transmit color light including said particular color component is arranged behind the field lens 13. With this arrangement, color light is derived from the color striped filter 14 by means of transmission separating zones of the blocking layers and the transmitting layers. To focus the above color light onto the photoelectric plane of the image pickup tube, it is focussed onto the image pickup tube 16 through a relay lens 15. While the image is scanned by an electron beam of the image pickup tube 16 it is converted to an electrical signal and taken out of the output of the image pickup tube 16.

Figure 1:
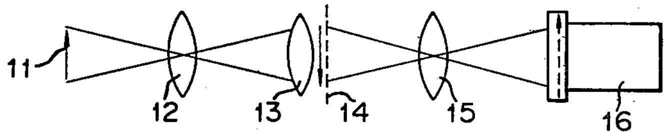
FIG. 1 is a schematic diagram showing an optical system of a color television image pickup in accordance with the present invention.
Figure 2A:
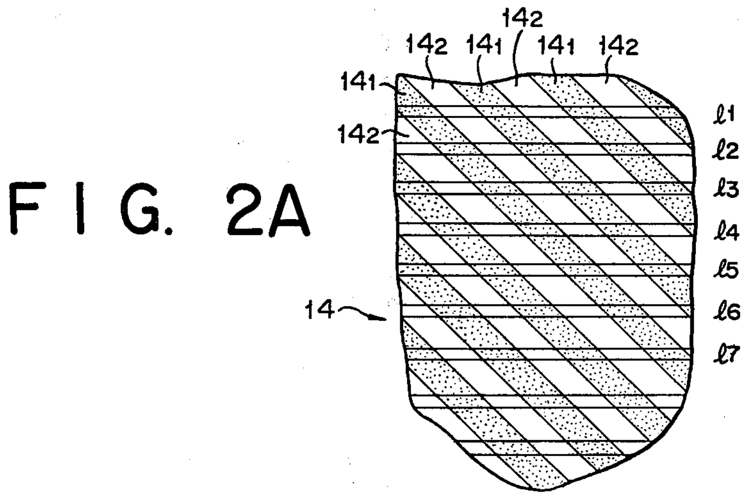
FIG. 2A illustrates an example of a color striped filter adapted for use in said optical system.

As seen from FIG. 2A, the color striped filter 14 includes alternate arrangement of filter layers $\mathbf{14_1}$ which block particular optical color light and filter layers $\mathbf{14_2}$ which transmit all color lights including said particular color light, at an appropriate angle with respect to the scanning line. The angle of tilt of the filter layers $\mathbf{14_1}$, $\mathbf{14_2}$ relative to the scanning line may be arbitrarily determined depending upon the width of the color striped filter 14 and the size of the photoelectric plane of the image pickup tube. The relationship between the scanning line and the filter layers $\mathbf{14_1}$, $\mathbf{14_2}$ of the color striped filter 14 is such that when the first scanning line $l_1$, for example, of the upper stage starts to scan from the phase in which said particular optical color light is blocked, the second scanning line $l_2$ starts to scan from the phase in which said particular color light as well as other color lights is transmitted, and similarly the odd numbered scanning lines $l_3$, $l_5$ . . . scan from the blocking phase while the even numbered scanning lines scan from the transmitting phase.

Figure 2B:
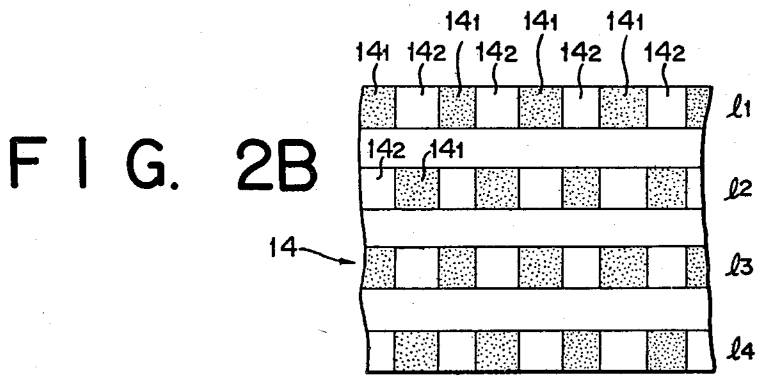
FIG. 2B is an equivalent view, in mosaic like form, of FIG. 2A.
Figure 3:
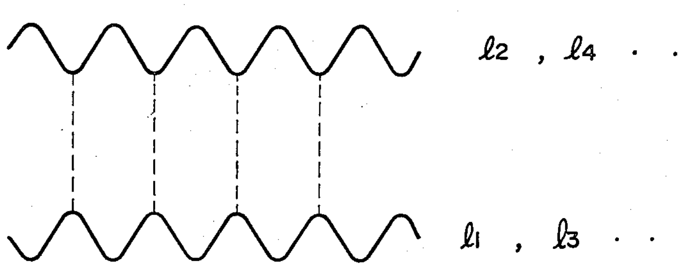
FIG. 3 shows waveforms of electrical signals derived from the color striped filters shown in FIG. 2A.

Of the scanning lines $l_1$, $l_2$, $l_3$, $l_4$ . . . of FIG. 2A, an enlarged view of a portion thereof, the scanning lines $l_1$ to $l_4$, as shown in FIG. 2B. The scan of the first scanning line $l_1$ starts from a blocking filter layer $\mathbf{14_1}$, the transmitting layers $\mathbf{14_2}$ and the blocking layers $\mathbf{14_1}$ being alternately arranged in sequence. The scan of the second scanning line $l_2$ starts from a filter layer $\mathbf{14_2}$ to the alternate blocking layers $\mathbf{14_1}$ and the alternate transmitting filter layers $\mathbf{14_2}$. These scanning lines, when viewed as a whole, present a checkered pattern of the blocking filter layers $\mathbf{14_1}$ and the transmitting filter layers $\mathbf{14_2}$, and an electric signal is derived from the image pickup tube 16.

The electric signal waveform thus derived from the image pickup tube 16 has a phase difference of 180° between even numbered scanning lines $l_2$, $l_4$, $l_6$ . . . and the odd numbered scanning lines $l_1$, $l_3$, $l_5$ . . . , thereby the carrier is modulated by the optical color light. Namely, since the waveform may be analyzed as a function whose cycle corresponds to two scanning lines, it may be developed as follows using Fourier progression:

$$f(t)=\sum_{m=1}^{\infty}\frac{4\frac{f}{f_H}\left(1+\cos\frac{2\pi f}{f_H}\right)}{\left\{2\frac{f}{f_H}+(2m-1)\right\}\left\{2\frac{f}{f_H}-(2m-1)\right\}\pi}\cdot\cos(2m-1)\pi f_H t+\sum_{m=1}^{\infty}\frac{2(2m-1)\sin\frac{2\pi f}{f_H}}{\left\{2\frac{f}{f_H}+(2m-1)\right\}\left\{2\frac{f}{f_H}-(2m-1)\right\}\pi}\cdot\sin(2m-1)\pi f_H t$$

where $m$ is an integer, $f$ is a carrier (frequency which is determined by the color striped filter 14) and $f_H$ is the frequency of horizontal scanning.

Figure 4:
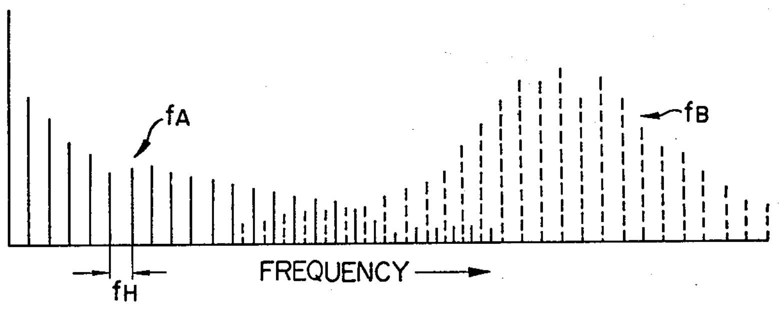
FIG. 4 is a frequency spectrum chart of a color television signal derived from the filter of FIG. 2A.

Thus, as seen from the above equation, since the frequency component derived from the color striped filter 14 equals to $[(2m-1)f_H]/2=(m-½)f_H$, there occurs unmodulated component, that is, a low frequency component $f_A$ derived from the transmitting filter layers $\mathbf{14_2}$ of the color striped filter 14 as shown by a solid line in the frequency spectrum of FIG. 4, and modulated component, that is, a high frequency component $f_B$ derived from the blocking filter layers $\mathbf{14_1}$, as shown by a dotted line in FIG. 4. Since the modulated wave occurs at the distance of $½f_H$ from an integer multiple of the horizontal scan frequency $f_H$ of the unmodulated wave, it does not coincide with an integer multiple of the horizontal scan frequency $f_H$.

Therefore, it presents an interleaved relationship as in the sub-carrier of 3.58 MHz in the NTSC system. Thus the unmodulated low frequency component and the modulated high frequency component are completely separated.

Figure 5:
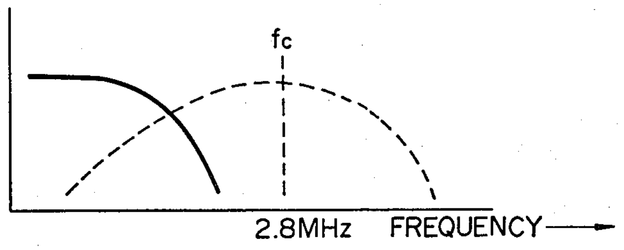
FIG. 5 shows another frequency characteristic of the signal derived through the striped filter of FIG. 2A.

The preferred embodiment of the present invention will now be explained in more detail. When red and blue signals are separated from an incident light of the object having red and blud color light components, the object 11 having said two color components is focussed by the field lens 13 through the picture lens 12, the color light of this optical system is passed to the color striped filter 14 constructed as shown in FIG. 2A so that blue light is blocked by the filter layers $\mathbf{14_1}$ while only the red light is transmitted therethrough. Where the width of the filter layers $\mathbf{14_1}$ and $\mathbf{14_2}$ of the color striped filter 14 is selected to $19\mu$, the angle of tilt of the color striped filter 14 relative to the scanning lines $l_1$, $l_2$, $l_3$ . . . is selected to 45° and a ⅔ inch vidicon is used, then the effective picture area is 8.8×6.6 mm² and the carrier wave $f_C$ is 2.8 MHz as shown in FIG. 5. The color light transmitted through the color striped filter 14 is focussed on the image pickup tube 16 to produce the frequency characteristics as shown in FIG. 5 from the output of the image pickup tube 16. When it is developed into a Fourier progression, the horizontal scanning frequency of low frequency components due to the unmodulated red component of the color light is an integral of multiple of $f_H$ while relatively high frequency components due to the modulated blue component of the color light is an odd multiple $½f_H$ and does not correspond to an integer multiple of the horizontal scanning frequency $f_H$.

Figure 6:
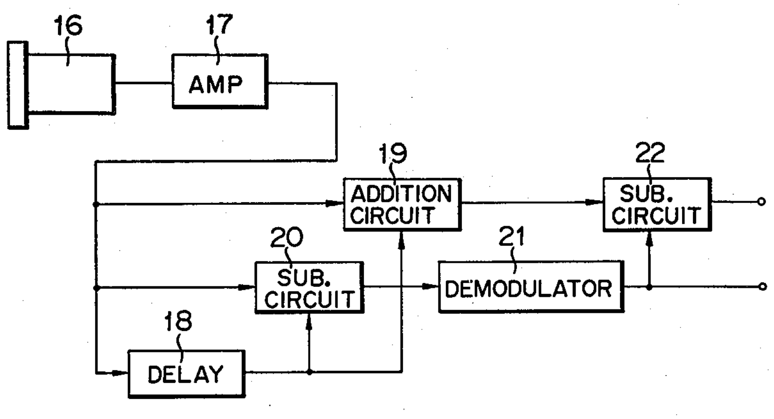
FIG. 6 shows an example of a color signal separation circuit in accordance with the present invention.

The electric signal derived from the color light is separated into respective components by the color signal separation circuit of FIG. 6. Namely, a plurality of signals taken out of the image pickup tube 16 are, after being amplified by the amplifier 17, branched into three, one being supplied to a delay circuit 18 for delaying by one horizontal scanning period of the carrier and the remainders being supplied to an addition circuit 19 and a subtraction circuit 20. In the addition circuit 19, the amplified signal and the signal derived from the delay circuit and delayed by one horizontal scanning period are added together to produce only the low frequency component of the unmodulated light component. Similarly, in the subtraction circuit 20, the same two signals that were supplied to the addition circuit 19 are subtractively combined to produce only the high frequency component of the modulated light component. The signal from the subtraction circuit 20 is fed to a demodulator 21 and detected to produce said signal corresponding to said particular color component, that is, the blue signal. The output signal of the addition circuit 19, on the other hand, is fed to a correction circuit, e.g., a subtraction circuit 22 together with the output signal of the demodulator circuit 21. In the subtraction circuit 22, the particular color component contained in the low frequency component is removed to produce the red signal. In this manner, even when the carrier frequency is at 2.8 MHz it is easy to produce the red and blue signals of the high frequency band near 2.8 MHz.

The output of the image pickup tube 16 after being delayed by one horizontal scanning period of the carrier wave by the delay circuit 18 is supplied to the addition circuit 19 and the subtraction circuit 20 in the above embodiment.

In the following embodiment, the color light of the object including a plurality of color components is passed through the picture lens and the field lens to a specific filter, that is, a color striped filter including an alternate arrangement of filter layers which blocks only particular color light and layers which transmit said particular color light, arranged inclined to the scanning line, to be focussed onto the plane of the image pickup tube and converted to an electric signal by said image pickup table, which signal is then separated by a color signal separation circuit.

Another embodiment of this invention will now be explained in detail with reference to FIGS. 7 and 15. The arrangement of the optical system is identical to that shown in FIG. 1 except for the color striped filter 24.

The color striped filter 24 will now be explained in detail with reference to FIG. 7. The color striped filter 24 includes first and second color striped filter elements to form a single color striped filter arrangement 24. The first color striped filter element includes an alternate arrangement of the layers $24_1$ which transmit all color lights and the layers $24_2$ which block only particular color light among the color lights due to a plurality of color components, each arranged perpendicularly to the horizontal scanning line (not shown). The second color striped filter element includes an alternate arrangement of the layers $24_3$ which transmit all color lights and the layers $24_4$ which block only that color component which corresponds to a particular color component, each arranged with an appropriate angle of tilt relative to the scanning line, said angle being determined such that when the color striped filter 24 is scanned the respective frequencies may be interleaved.

That is, the first color striped filter may be represented as shown in FIG. 8A and it includes an alternate arrangement of the layers $24_1$ which transmit all color lights and the layers $24_2$ which block only particular color light, arranged perpendicularly to the first scanning line $l_1$, second scanning line $l_2$, . . . which are uniformly spaced and scanned horizontally. The scanning lines $l_1$, $l_2$, $l_3$ . . . commence from the layers $24_1$ which transmit all color lights and then to the blocking layers $24_2$ and the transmitting layers $24_1$ sequentially and alternately. Thus, as shown in FIG. 8C, the signal waveforms of same phase are produced at the first scanning line $l_1$, the second scanning line $l_2$, the third scanning line $l_3$ . . . .

On the other hand, the second color striped filter, as shown in FIG. 8B, includes an alternate arrangement of the layers $24_3$ which transmit all color lights and the layers $24_4$ which block a paritcular color light, each arranged with appropriate angle relative to the first scanning line $l_1$, the second scanning line $l_2$, the third scanning line $l_3$, . . . which are uniformly spaced and scanned horizontally. The scan commences from the layer $24_3$ which transmits all color lights at the first scanning line $l_1$ and commences from the blocking layer $24_4$ at the second scanning line $l_2$. In other words, the odd numbered scanning lines $l_1$, $l_3$, $l_5$, . . . commence from the transmitting layers $24_3$ and the even numbered scanning lines $l_2$, $l_4$, $l_6$, . . . commence from the layers $24_4$ which block only a particular color light. When observed in enlarged scale, the scanning lines $l_1$, $l_2$ , $l_3$, . . . appear as if they are arranged in checkered pattern.

Therefore, signal waveforms having a phase difference of 180° are derived from odd numbered scanning lines $l_1$, $l_3$, $l_5$ . . . and even numbered scanning lines $l_2$, $l_4$, $l_6$ . . . .

Thus, the signal produced by scanning the color striped filter 24 thus formed with the image pickup tube 16 has its carrier generated as a function of the respective pitch of the color striped filter amplitude modulated by the color light of the object 11, and the electric signals produced by scanning the first and second color striped filter elements are located about the carrier at the interval of the horizontal scanning frequency $f_H$ and present an interleaved form having no identical frequency components (See FIG. 9).

Now, analysing said signal waveform, since a cyclic function with the cycle of $1/f_H$ is given for the first color striped filter, the frequency $f_1$ generated is derived as follows:

$$f(t)=\frac{f_H}{2\pi f_1}\left(1-\cos\frac{2\pi f_1}{f_H}\right)+\sum_{n=1}^{\infty}\frac{\frac{2f_1}{f_H}}{\pi\left(\frac{f_1}{f_H}+n\right)\left(\frac{f_1}{f_H}-n\right)}\cdot\left(1-\cos\frac{2\pi f_1}{f_H}\right)\cos 2\pi n f_H t+\sum_{n=1}^{\infty}\frac{2n}{\left(\frac{f_1}{f_H}+n\right)\left(\frac{f_1}{f_H}-n\right)}\sin\frac{2\pi f_1}{f_H}\sin 2\pi n f_H t$$

With the color striped filter 24 constructed as shown in FIG. 7, it is equivalent to use two filters as shown in FIGS. 8A and 8B. From FIGS. 8A and 8B, the signal waveforms as shown in FIGS. 8C and 8D are derived.

Since a cyclic function with the cycle of $2/f_H$ is given for the second color striped filter element the frequency $f_2$ generated in response to the blocking layers $24_4$ is derived as follows:

$$f(t) = \sum_{m=1}^{\infty} \frac{4\frac{f_2}{f_H}\left(1 + \cos\frac{2\pi f_2}{f_H}\right)}{\pi\left\{\frac{2f_2}{f_H} + (2m-1)\right\}\left\{\frac{2f_2}{f_H} - (2m-1)\right\}} \cdot \cos(2m-1)\pi f_H t + \sum_{m=1}^{\infty} \frac{2(2m-1)\sin\frac{2\pi f_2}{f_H}}{\pi\left\{\frac{2f_2}{f_H} + (2m-1)\right\}\left\{\frac{2f_2}{f_H} - (2m-1)\right\}} \cdot \sin(2m-1)\pi f_H t$$

As seen from the above formulea, since the frequency components derived from the color striped filter 24 include $nf_H$ and $(m-½)f_H$ and they appear at the areas corresponding to harmonics of $f_H$ for the first color striped filter element and at the areas corresponding to odd multiples of $½f_H$ for the second color striped filter element, the harmonics modulated by the first color striped filter element (shown by a solid line in the figure) and the harmonics modulated by the second color striped filter (shown by a dotted line) are completely interleaved so that both frequency components may be completely separated without overlapping on the same frequency axis. Thus, as seen from FIG. 9, even when an unmodulated component and a plurality of modulated harmonics are interfered with each other, a complete separation may be achieved as described above.

A more detailed description is given below. Assuming that the green component color light is the unmodulated component and the color light components of blue and red are the modulated components, the manner in which those three color signals are produced is as follows: As shown in FIG. 7, the green, blue and red color lights are transmitted through the layers $24_1$ of the first color striped filter element which transmit all color lights, and the red color light is blocked by the layers $24_2$ which block a particular color light. The width of the transmitting layers $24_1$ and the blocking layers $24_2$ is set to 26$\mu$. Also, the green, blue and red color lights are transmitted through the layers $24_3$ which transmit all color lights, and the blue color light is blocked by the layers $24_4$ which block only the particular color light. The angle of tilt of those layers relative to the scanning line is set to 45°, and the vertical distance of alternately arranged layers is selected to 21$\mu$. The color light of the object 11 comprising three color components is then passed through the color striped filter 24 to be scanned by the image pickup tube 16. The output signal based on the blue color light has a phase difference of 180° and a carrier of $(m-½)f_H$ so that it deviates from the horizontal scanning frequency $f_H$ by $½f_H$. Since the red color light blocked by the first color striped filter presents the same phase for each scan it has a frequency component whose carrier is $nf_H$, resulting in a completely interleaved waveform. As shown in FIG. 10, the blue color light blocked by the second color striped filter produces a carrier of 2.8 MHz and the red light blocked by the first color striped filter element produces a carrier of 3.2 MHz. The signal G of the green color light extends to 2.7 MHz as the unmodulated low frequency component and the blocked blue signal B has the carrier of 2.8 MHz which includes the lower side band of 2.3 MHz and upper side band of 3.3 MHz. The blocked red signal R has the carrier of 3.2 MHz which includes the lower side band of 2.7 MHz and upper side band of 3.7 MHz. The effective picture area of the image pickup tube is 8.8×6.6 mm².

Means for separating the three-color signal derived from the image pickup tube 16 is now explained in detail with reference to FIG. 11. The output signal of the image pickup tube 16 is amplified by the amplifier 17 and then supplied to the addition circuit 19, subtraction circuit 20 and the delay circuit 18 for delaying the horizontal scan cycle by 1H period (horizontal scanning period). In the addition circuit 19, the amplified signal and the 1H period delayed signal are additively combined to produce only harmonics of the horizontal scanning frequency $f_H$. On the other hand, in the subtraction circuit 20, the amplified signal and the 1H period delayed signal are subtractively combined to produce the $(m-½)f_H$ component. Then the harmonic components from the addition circuit 19 are passed to a low pass filter 25 which passes the frequency of 0 to 2.7 MHz and a band pass filter 26 which passes the frequency of 2.7 to 3.7 MHz. The output from the band pass filter 26 is demodulated by a demodulator 27 to produce the red signal. Since the signal taken out of the low pass filter 25 includes a D.C. component of the blue signal B and the red signal R, the signals from the demodulator 27 and a demodulator 28 described below are subtractively combined with the output of low pass filter 25 in a subtraction circuit 22 to produce the green signal G. Also the output signal from the subtraction circuit 20 is passed to a band pass filter 29 which passes the frequency of 2.3 to 3.3 MHz and then demodulated by a demodulator 28 to produce the blue signal B. The red and blue signals are shown as modulated carriers and as shown in FIG. 10, the frequency bandwidths of the green signal G, the demodulated red signal R and the demodulated blue signal B are at 2.7 MHz, 0.5 MHz and 0.5 MHz, respectively. The carriers for the red and blue signals are 3.2 MHz and 2.8 MHz, respectively, as shown in FIG. 10. The carrier $f_{C2}$ for the red signal R may be approximated to the carrier $f_{C1}$ for the blue signal B, as shown in FIG. 12. It is necessary, however, that the green signal G of low frequency component and the red signal R of high frequency component be operated an so that they do not interfere with each other. Furthermore, even when the green signal G of low frequency component and the blue signal B of high frequency component are completely overlapped with each other as shown in FIG. 13, it is easy to separate them because they are frequency interleaved. Also when the blue signals B of high frequency component are overlapped with each other as shown in FIG. 14, they can be completely frequency interleaved as in the previous case. Although it is assumed in the above description that the green signal G is of low frequency, the red signal R is the first harmonics and the blue signal B is the second harmonics, the arrangement of the three-color signal may be selected in any way depending upon the construction of the color striped filter 24. The teaching of this invention is also applicable to an apparatus for generating television signals with scanning means such as a flying spot in place of the image pickup tube 16. Although in the explanation of the interleaving the scanning line based on the second color striped filter is selected so that its phase deviation is 180°, it may be interleaved in such a manner as to have a 90° or 270° phase deviation. In this case, no other signals are located intermediate the high frequency of the horizontal scanning frequency $f_H$ and the waveform of $\frac{1}{4}f_H$ off-set is produced.

FIG. 15 illustrates still another color striped filter 34. It comprises a first color striped filter element and a second color striped filter element overlaid on one another. The first color striped filter element includes an alternate arrangement of layers $\mathbf{34_1}$ which transmit all color lights and layers $\mathbf{34_2}$ which block particular color light, arranged with an appropriate angle of tilt relative to the direction normal to the scanning lines $l_1$, $l_2$, $l_3$, . . . . For the odd-numbered scanning lines $l_1$, $l_3$, . . . they commence from the transmitting layers $\mathbf{34_1}$ and pass through the blocking layers $\mathbf{34_2}$ and then through the transmitting layers $\mathbf{34_1}$ in sequence and alternately. The second color striped filter element includes an alternate arrangement of the layers $\mathbf{34_3}$ which transmit all color lights and the layers $\mathbf{34_4}$ which block a particular color light other than said particular color light for the first color striped filter, said transmitting layers $\mathbf{34_3}$ and the blocking layers $\mathbf{34_4}$ being arranged with an angle of tilt relative to the direction normal to the scanning lines $l_1$, $l_2$, $l_3$ . . . as in the case of the first color striped filter, the angle of tilt for the second color striped filter being different from that for the first color striped filter. For the odd numbered scanning lines $l_1$, $l_3$, . . . , they commence from the transmitting layer $\mathbf{34_3}$ and then pass through the blocking layer $\mathbf{34_4}$ and the transmitting layer $\mathbf{34_3}$ in sequence and alternately. For the even-numbered scanning lines $l_2$, $l_4$, . . . , they commence from the blocking layer $\mathbf{34_4}$ and then pass through the transmitting layer $\mathbf{34_3}$ and the blocking layer $\mathbf{34_4}$ in sequence and alternately.

Thus, when the color light including a plurality of color components is passed to the color striped filter 34 constructed as described above and scanned by the image pickup tube 16, the odd numbered scanning lines $l_1$, $l_3$, . . . commence from the transmitting layers $\mathbf{34_1}$, $\mathbf{34_3}$, that is, they commence from the transmitting phase. On the other hand, the even-numbered scanning lines $l_2$, $l_4$ . . . are inclined so that they have a phase difference of 180° in order to ensure that they commence from the blocking layers $\mathbf{34_2}$, $\mathbf{34_4}$.

The modulated wave components $f_2$, $f_3$ obtained by scanning with the image pickup tube 16 the color light derived from the respective blocking layers $\mathbf{34_2}$, $\mathbf{34_4}$ of the color striped filter 34 have waveforms as shown in FIG. 16 wherein the carriers $f_{C1}$, $f_{C2}$ produced depending upon the pitches of the respective layers $\mathbf{34_2}$, $\mathbf{34_4}$ are amplitude modulated by the signal of the object 11. More particularly, the signals produced by scanning the first and second color striped filters are arranged at the interval of the horizontal scanning frequency $f_H$ about the first and second carriers $f_{C1}$, $f_{C2}$ and the carriers $f_{C1}$, $f_{C2}$ and odd harmonics of one-half of the horizontal scanning frequency $f_H$. Non-modulated wave component $f_1$ transmitted without being blocked by any of the layers $\mathbf{34_1}$ to $\mathbf{34_4}$ of the first and second striped filters appears for each harmonic of the horizontal scanning frequency $f_H$.

Thus, the modulated wave components $f_2$, $f_3$ which are blocked by the first and second color striped filter elements and the non-modulated wave component $f_1$ transmitted through all of the layers $\mathbf{34_1}$ to $\mathbf{34_4}$ are not overlapped but completely interleaved.

More particularly, it is assumed for the first color striped filter that the vertical distance of the layers $\mathbf{34_1}$ which transmit all color lights, i.e., red, blue and green color lights and the layers $\mathbf{34_2}$ which transmit cyanic color light and block only red color light is selected to $21\mu$, and the angle of tilt is set to 45° relative to the direction of scan. For the second color striped filter, the vertical distance of the layers $\mathbf{34_3}$ which transmit all color lights, i.e., red, blue and green color lights and the layers $\mathbf{34_4}$ which transmit yellow color light and block only blue color light is selected to $17\mu$, and the angle of tilt is set to 60° relative to the direction of scan. With this arrangement, the first color striped filter has an effective width of $30\mu$ in the direction of scan and the second color stripe filter has an effective width of $20\mu$. Thus, when the color light of the object 11 including a plurality of color components is passed to the color striped filter 34 thus constructed, and scanned by the image pickup tube 16, the carrier $f_{C1}$ of 2.8 MHz, $f_{C2}$ of 4.2 MHz and the red and blue side bands of ± 700 KMHz, respectively, are obtained. The unmodulated wave component for the green signal may be extended up to 5 MHz. Thus, within the frequency band of the brightness signal different frequency bands for red and green are provided.

The frequency components of the above three signals derived from the image pickup tube 16 are separatd by the color signal separation circuit of FIG. 18. More particularly, said frequency components are amplified by the amplifier 17 connected to the output of the image pickup tube 16 and thereafter branched to three ways, i.e., addition circuit 19, subtraction circuit 20 and 1H delay circuit 18 which provides a delay of 1H (horizontal scanning period). The addition circuit 19 additively combines the output of the 1H delay circuit 18 and the output of the amplifier 17 to produce harmonics of the horizontal scanning frequency $f_H$. Thus an unmodulated signal is provided. The subtraction circuit 20, on the other hand, subtractively combines the output of the 1H delay circuit 18 and the output of the amplifier 17 to produce only the $(m-\frac{1}{2})f_H$ component so that the modulated wave components $f_2$, $f_3$ based on the blocking layers $\mathbf{34_2}$ and $\mathbf{34_4}$ of the first and second color striped filters are generated. The output signal of the subtraction circuit 20 is separated into two modulated wave components $f_2$, $f_3$ through the band pass filters 35, 36 which pass only the frequency bands of 2.1 to 3.5 MHz and 3.5 to 4.9 MHz, respectively. The modulated frequency components $f_2$, $f_3$ passed through the band pass filters 35, 36 are detected and demodulated by the demodulators 37 and 38, respectively, to produce the red signal R and the blue signal B. Since the output signal from the addition circuit 19 includes D.C. components of the red signal R and the blue signal B, said red signal R and the blue signal B derived from the respective demodulators 37 and 38 are subtractively combined with the output from the addition circuit 19 to remove the red signal R and the blue signal B to produce the green signal G.

Since the green signal G is of wide band it may be used as an intensity signal, and it may be possible to modify the three principal color signals through a generally used matrix circuit. In the embodiment immediately described above, red and blue signals are modulated, but any two color signals of three principal colors may be selected and hence various combinations may be provided. Although the stripes are inclined upwardly from the right to the left in the illustrated embodiment, they may be inclined reversely, one may be inclined reversely to the other. Although separate color striped filter 34 is used to focus the image on the relay lens 15 in the illustrated embodiment, it may be provided directly on the photoelectric plane of the image pickup tube 16.

What we claim is:

1. A color television image pickup apparatus comprising:

an optical system including a color striped filter including a plurality of first and second stripe elements, said first and second stripe elements being equally spaced blocking elements for blocking first and second color lights, respectively, said first stripe elements being dimensioned and inclined relative to the direction of a horizontal scanning line so that image signal components obtained upon each alternate scan by a scanning electron beam have a phase difference of 180° with respect to each other relative to the signal period corresponding in time to the scanning of each first element of said stripe filter, said second stripe elements being dimensioned and superimposed on said first stripe elements at different pitches than said first stripe elements and at different angles of inclination than said first stripe elements relative to said direction of horizontal scanning so that:

image signal components of the second stripe elements obtained upon each alternate scan have a carrier frequency which is higher than that of said image signal components corresponding to said first stripe element;

that the frequency of the color signal corresponding to said first stripe elements is interleaved with that of the color signal corresponding to said second stripe elements and the horizontal scanning frequency component of the color television signals; and that the image signal components of the second stripe elements obtained upon each alternate scan have the same phase relationship with respect to each other relative to the signal period corresponding in time to the scanning of each second stripe element; and receiving means responsive to light transmitted through said filter for forming color television signals having the frequency components corresponding to said respective first and second stripe elements.

2. A color television image pickup apparatus according to claim 1 wherein said second stripe elements are disposed perpendicular to the direction of the horizontal scanning line.

3. A color television image pickup apparatus according to claim 1 wherein the width of each of said first elements equals the distance between adjacent first elements.

4. A color television image pickup apparatus according to claim 1 wherein said receiving means for forming said color television signal comprises an image pickup tube receiving light from said optical system; a circuit arrangement for delaying the signal derived from said image pickup tube by one horizontal scanning period; an addition circuit for adding the delayed signal and the output of the image pickup tube; a first subtraction circuit for subtracting the delayed signal from the output of the image pickup tube; a first demodulator for demodulating the output of said first subtraction circuit; a second demodulator for demodulating the output of said addition circuit; and a second subtraction circuit for subtracting the outputs of the first and second demodulators from the output of the addition circuit.

5. A color television image pickup apparatus according to claim 4 wherein said means for forming said color television signal further comprises a first band-pass filter connected between said first subtraction circuit and said first demodulator; a second band-pass filter connected to the output of said addition circuit; and a low-pass filter connected between said addition circuit and said second subtraction circuit, thereby providing blue, red and green color signals at the outputs of said first demodulator, second demodulator and second subtraction circuit, respectively.

* * * * *

UNITED STATES PATENT AND TRADEMARK OFFICE
CERTIFICATE OF CORRECTION

PATENT NO. : 3,882,535

DATED : May 6, 1975

INVENTOR(S) : Yasuo TAKEMURA

It is certified that error appears in the above-identified patent and that said Letters Patent are hereby corrected as shown below:

On initial page of the patent, change inventor's last name from "Takeumra" to --Takemura--.

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*